US012065345B2

(12) United States Patent
Marshke et al.

(10) Patent No.: US 12,065,345 B2
(45) Date of Patent: Aug. 20, 2024

(54) VENTILATION LOUVER INSTALLATION TOOL

(71) Applicant: Allied Ventilation, Inc., Warren, MI (US)

(72) Inventors: Timothy E. Marshke, Bloomfield Hills, MI (US); Michael J. Wiedbusch, Ray, MI (US); David G. Niksa, Armada, MI (US)

(73) Assignee: Allied Ventilation, Inc., Warren, MI (US)

( * ) Notice: Subject to any disclaimer, the term of this patent is extended or adjusted under 35 U.S.C. 154(b) by 0 days.

(21) Appl. No.: 17/834,117

(22) Filed: Jun. 7, 2022

(65) Prior Publication Data

US 2023/0391596 A1 Dec. 7, 2023

(51) Int. Cl.

*B66F 9/18* (2006.01)
*B66F 9/075* (2006.01)
*F24F 13/14* (2006.01)

(52) U.S. Cl.

CPC ............ *B66F 9/18* (2013.01); *B66F 9/07554* (2013.01); *F24F 13/1413* (2013.01)

(58) Field of Classification Search

CPC ........................................................ B66F 9/19
USPC ........................................................... 414/11
See application file for complete search history.

(56) References Cited

U.S. PATENT DOCUMENTS 3,613,924 A * 10/1971 Monson .................... B66F 9/19 414/420
4,838,752 A * 6/1989 Bryant ...................... B66F 9/19 414/607
5,114,294 A * 5/1992 Attman ................. B66F 9/0655 D34/28
5,127,791 A * 7/1992 Attman ..................... B66F 9/10 52/745.11
5,863,169 A * 1/1999 Inkeroinen ............ E04G 21/167 52/749.11
9,620,040 B2 * 4/2017 Kaytes ................ G09F 15/0037
11,708,705 B2 * 7/2023 Fisher ................... E04H 17/263 414/217
2006/0101782 A1 * 5/2006 Sanders .............. E04F 21/1816 52/749.1
2021/0292144 A1 * 9/2021 Morton .................... B66D 3/12

* cited by examiner

*Primary Examiner* — Mark C Hageman

(74) *Attorney, Agent, or Firm* — Harness, Dickey & Pierce, P.L.C.

(57) ABSTRACT

A tool for installing ventilation louvers has a securing mechanism to secure the tool to a lifting device. A cross beam is coupled with the securing mechanism. A louver holder is pivotally coupled with the cross beam. The louver holder moves from a first securement position to a second installation position. A holding bar holds the louver holder in the first position. A handle enables manipulation of the louver holder from the first to the second position.

18 Claims, 5 Drawing Sheets

VENTILATION LOUVER INSTALLATION TOOL

FIELD

The present disclosure relates to buildings and, more particularly, to a tool and method for installing ventilation louvers in the building.

BACKGROUND

Ventilation louvers can be 20 feet high by 20 feet wide. Thus, this makes them tedious to manipulate to position and install into a building. Thus, it would be desirable to have a tool to expedite the installation.

In the past, louvers have been lifted and manipulated by cranes or the like to position onto the building. While this is satisfactory, it necessitates a significant amount of manipulation of the louver to position it in the receiving opening to retain or attached the louver to the building. Additionally, the cranes utilize a cable or chain that secures with louver to hold and enable manipulation. While it works satisfactorily, the chains and cables are outside of the building and enable the louver to be pushed into and held in position generally by manual manipulation.

It would be desirable to have a tool that could be utilized within the building when mounting the louvers to the building. It would also be desirable to use a lifting device, such as forklift, to help manipulate the louver into position in the receiving opening. This reduces the overall cost of installation of the louver into the building opening.

SUMMARY

According to a first aspect of the disclosure, a tool for installing ventilation louvers comprises a securing mechanism to secure the tool to a lifting device, such as a forklift. A cross-beam coupled with the securing mechanism. A louver holder is pivotally coupled with the cross beam. The louver holder moves from a first securement position to a second installation position. A holding bar holds the louver holder in the first. A handle enables manipulation of the louver holder from the first to the second position. A pair of rotary joints is coupled with the louver holder and the cross beam enabling the pivotal movement. The louver holder includes a pair of rails, one of the rails on each side of the cross beam facing one another. A support bar is secured between the rails. The rails include a flange to temporarily bolt the louver holder to a louver. A locking pin locks the louver holder in the second position. A fork lock enables a locking engagement of the securing mechanism with the lifting device. A weight balast may be coupled with the securing mechanism to adjust the center of gravity of the tool.

According to a second aspect of the disclosure, a combination fork lift and ventilation louver tool comprises a lifting device with at least one fork. A tool for installing ventilation louvers comprising a securing mechanism to secure the tool to the at least one fork. A cross-beam coupled with the securing mechanism. A louver holder is pivotally coupled with the cross beam. The louver holder moves from a first securement position to a second installation position. A holding bar holds the louver holder in the first. A handle enables manipulation of the louver holder from the first to the second position. A pair of rotary joints is coupled with the louver holder and the cross beam enabling the pivotal movement. The louver holder includes a pair of rails, one of the rails on each side of the cross beam facing one another. A support bar is secured between the rails. The rails include a flange to temporarily bolt the louver holder to a louver. A locking pin locks the louver holder in the second position. A fork lock enables a locking engagement of the securing mechanism with the at least one fork. A weight balast may be coupled with the securing mechanism to adjust the center of gravity of the tool.

According to a third aspect of the disclosure, a method for installing a louver in a building comprises providing a lifting device as described above. A louver is secured to the louver holder. The louver is positioned with respect to the ground. The holding bar is removed from the louver holder. The louver holder and louver are pivoted toward a vertical position. The louver is aligned in the louver receiving opening of the building. The louver is received in the opening in the building. The louver is passed through the louver receiving opening and is drawn back into the opening on the building. The louver is positioned horizontally on the ground and enables the holding bar to be removed to enable pivoting of the louver holder member. The louver, in its vertical position, is locked for installation purposes. After securing of the louver in the receiving opening, the tool is removed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
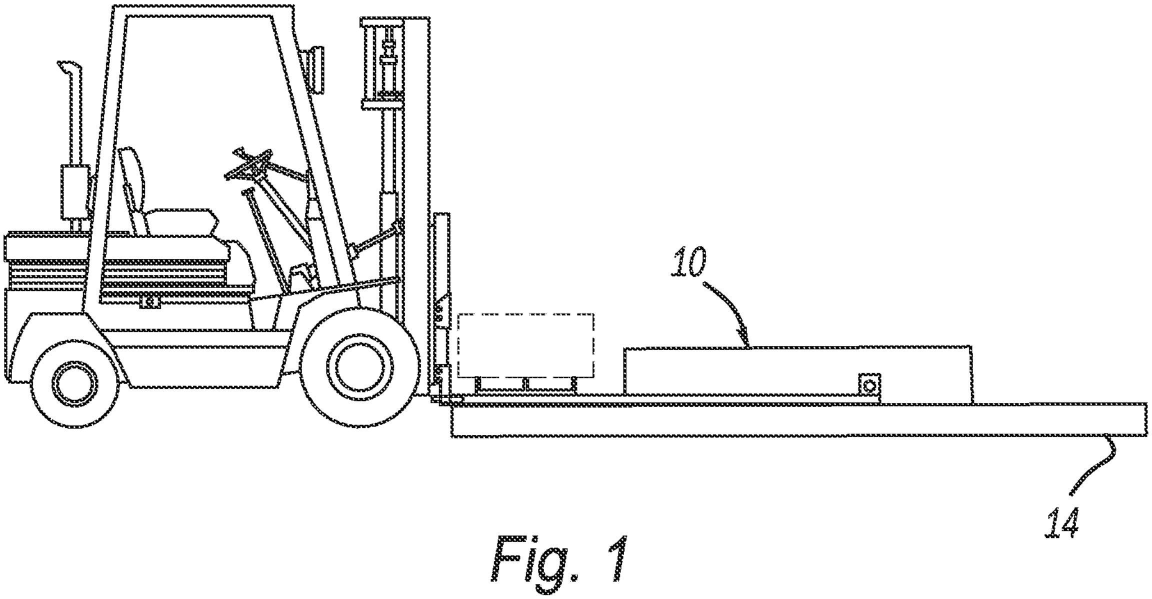
FIG. 1 is a schematic view of the tool on a lifting device.
Figure 2:
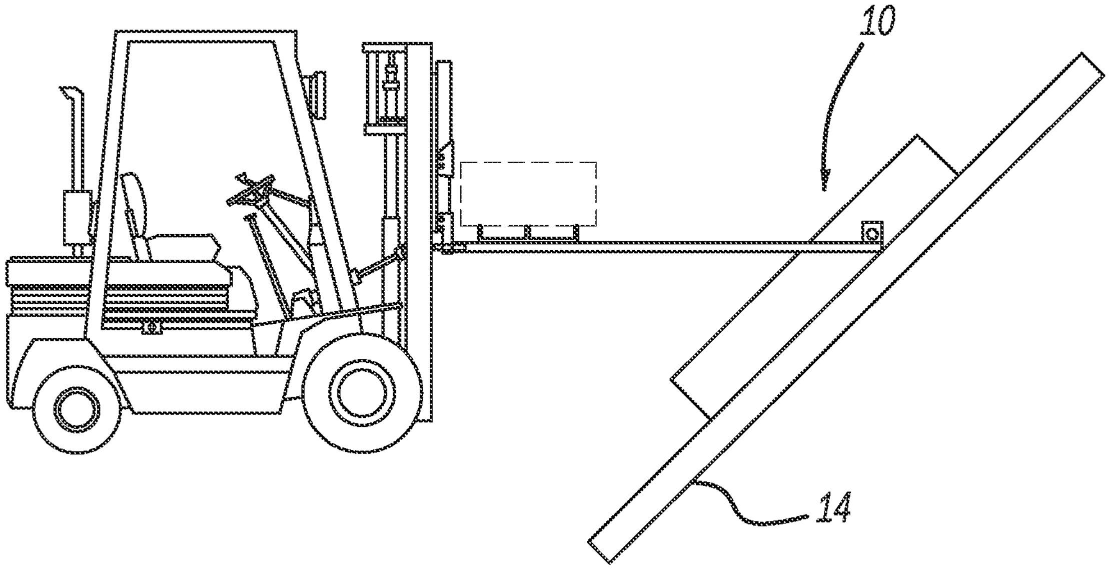
FIG. 2 is a schematic view of the tool on a lifting device.
Figure 3:
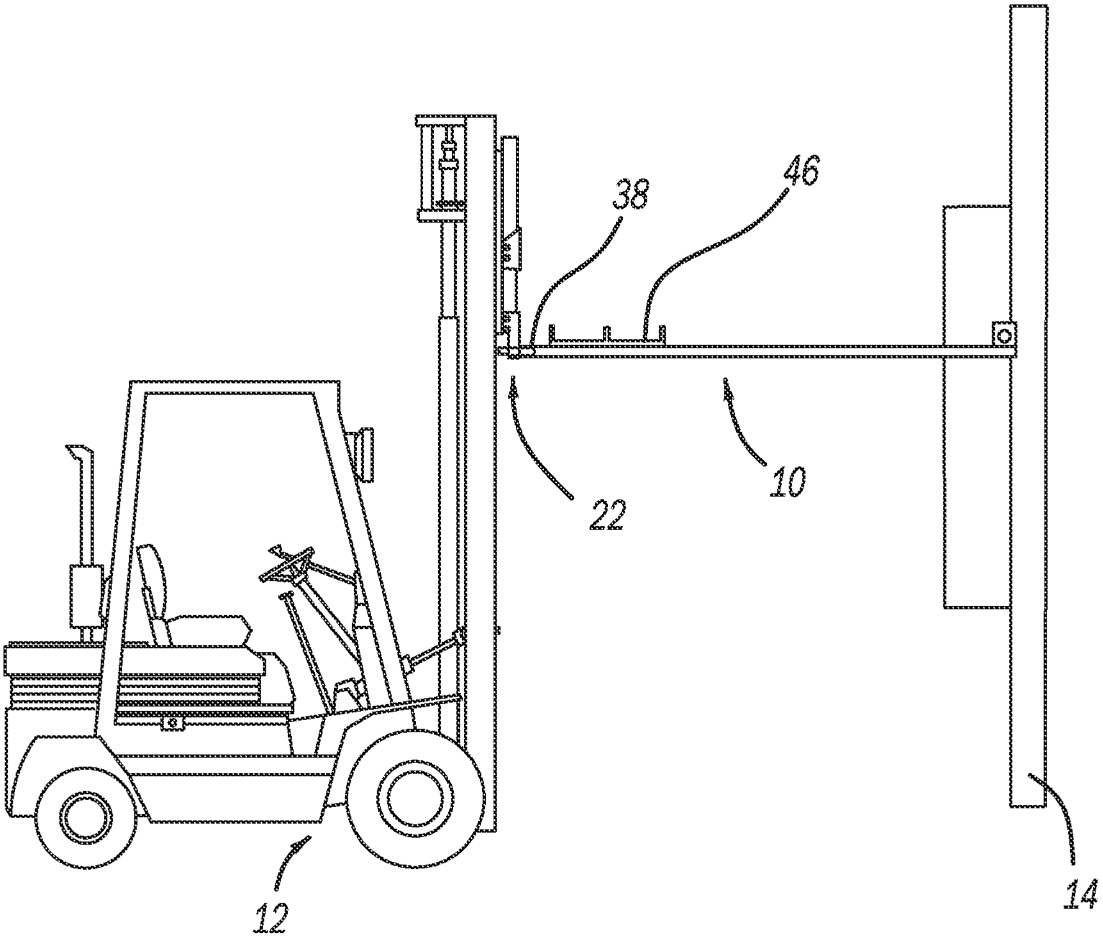
FIG. 3 is a schematic view of the tool on a lifting device.
Figure 4:
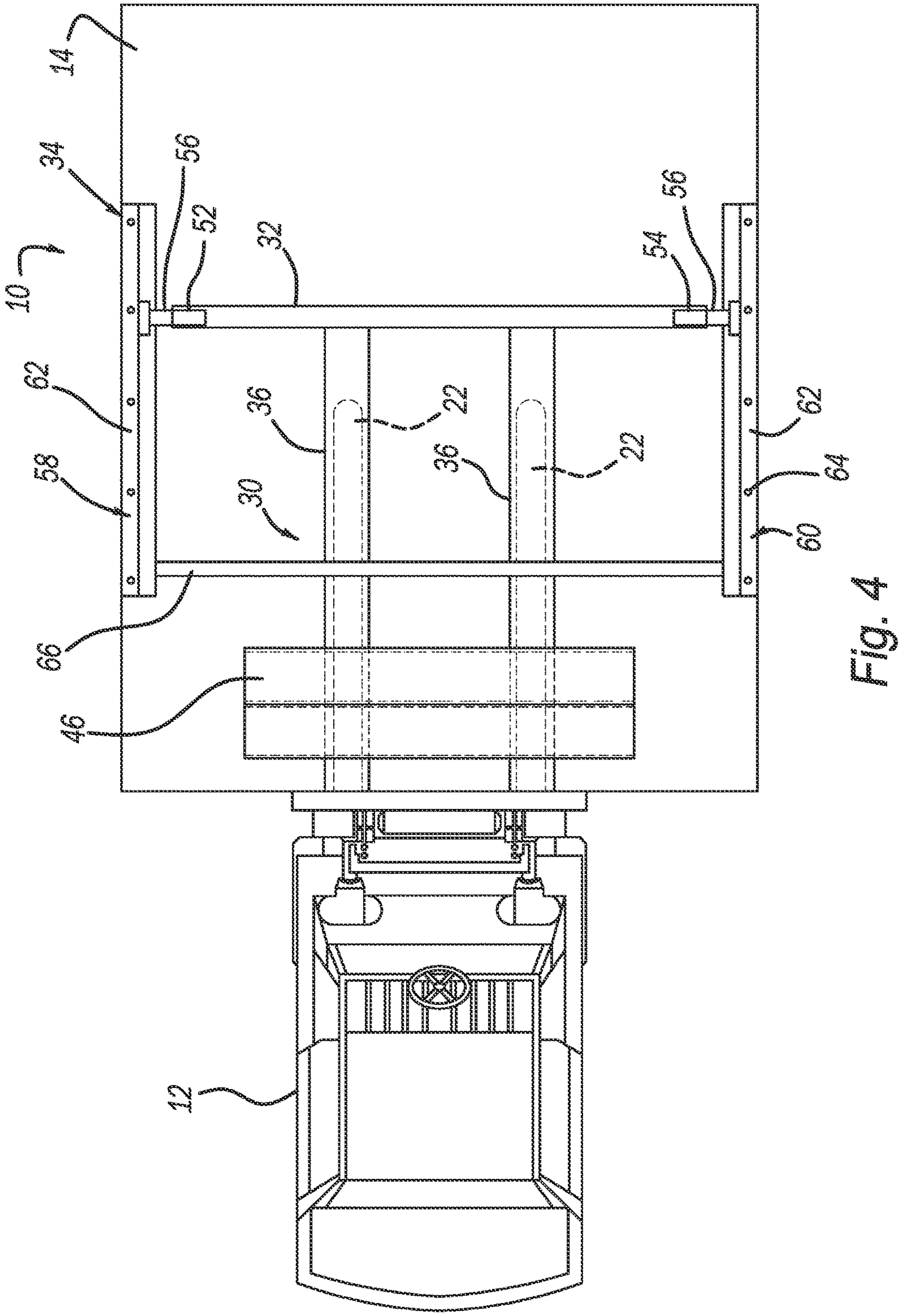
FIG. 4 is a plan view of the tool.
Figure 5:
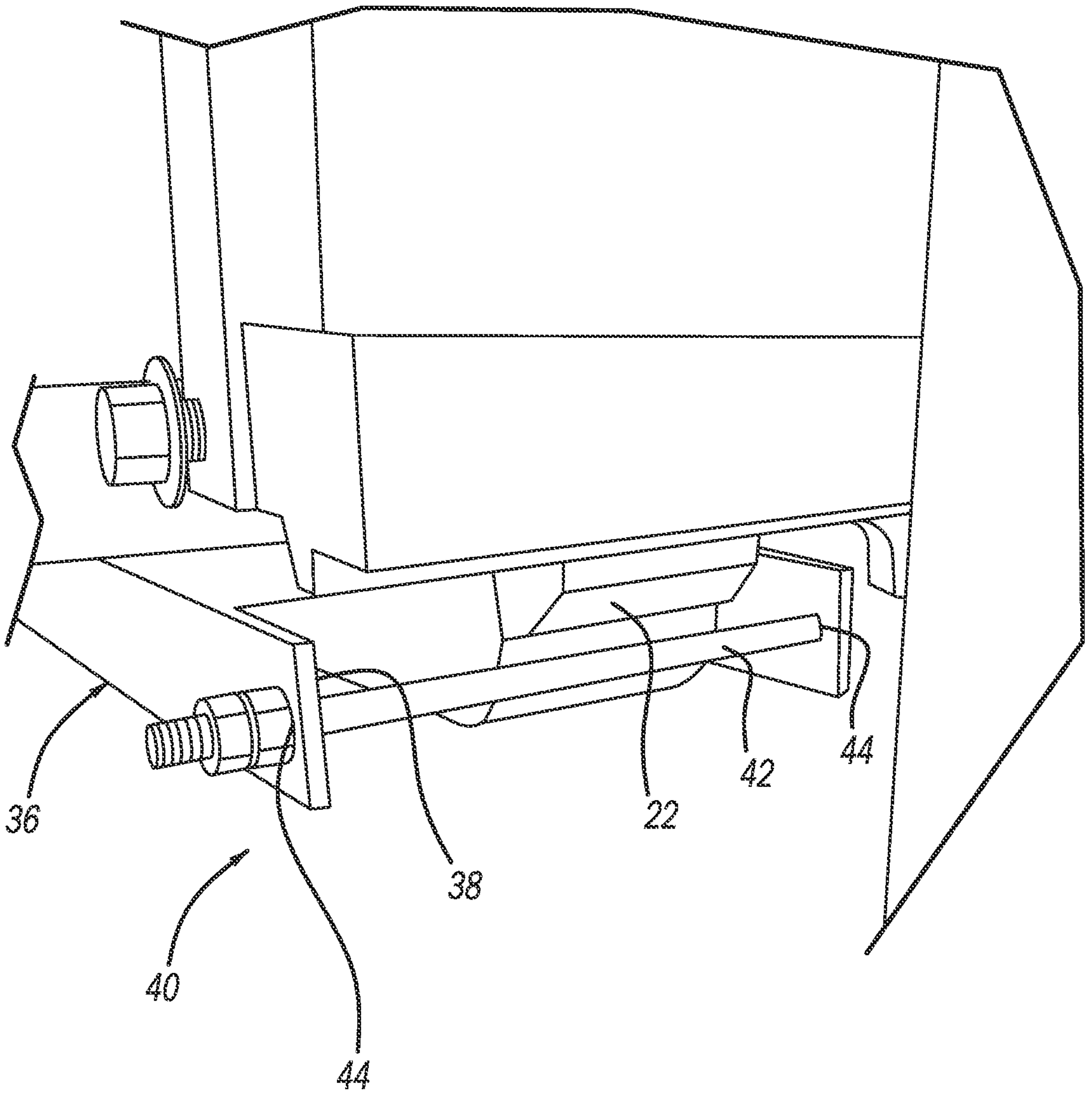
FIG. 5 is a perspective view of the tool.
Figure 6:
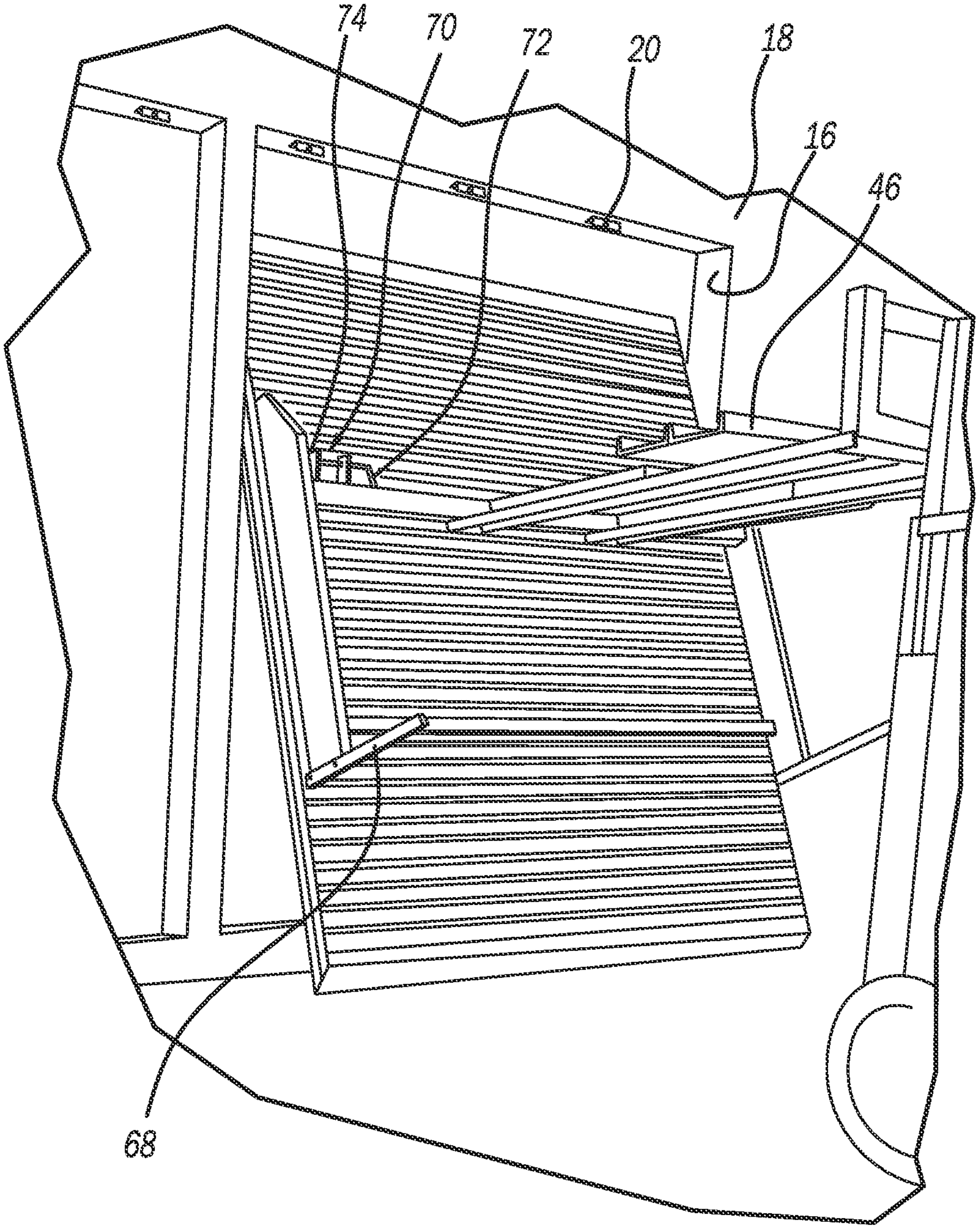
FIG. 6 is a perspective view of the tool.

Example embodiments will now be described more fully with reference to the accompanying drawings.

Turning to the figures, a tool 10 is illustrated on a lifting device, such as a forklift 12, positioning a louver 14 into a receiving opening 16 of the building 18. The opening 16 includes a plurality of securing flanges 20 bolted to the building 18. The securing flanges 20 include an aperture to receive a bolt to maintain, restrain or secure the louver 14 in the building opening 16. The lifting device 12 is a conventional forklift including one or more forks 22 that couple with the tool 10.

The tool 10 includes a securement mechanism 30, a cross beam 32 and a louver holder 34. The securement mechanism 30 includes at least one, shown with two, channel members 36. The channel members 36 receive a fork 22 of the lifting device 12. The channel members 36 generally are rectangular in cross-section and include a bore or channel 38 that receives the fork 22. The end of the channel member 36 includes a retention mechanism 40. The retention mechanism 40 includes a bar 42 that passes through apertures 44 at its end to position the bar 42 behind the fork 22 to lock the channel members 36 onto the forks 22.

A ballast plate 46 may be secured to the channel members 36. The ballast plate 46 may receive weights to adjust the center of gravity of the tool 10 and lifting device 12 when and if a louver 14 is attached and balance is needed in order to install the louver 14.

The cross beam 32 includes two ends 52, 54. The ends 52, 54 receive a pivot joint 56 that is coupled with the louver holder 34. The pivot joints 56 may be journal shafts that may be positioned inside of a cylindrical bore in the cross beam 32. Thus, the louver holder 34 is able to pivot with respect to the cross beam 32.

The louver holder 34 includes a pair of rails 58, 60. The rails 58, 60 are substantially identical and are L-shaped in cross section with a body and flange 62. The flange 62 secures the rails 58, 60 to the louvers 14. Generally, the flange 62 includes a plurality of apertures 64 to enable bolting of the flange onto the louvers 14 to temporarily hold the louver 14 onto the louver holder 34. A support bar spans the rails 58, 60. The support bar provides stability for the rails 58, 60 so that the rails 58,60 may move together with a louver 14 to position it into the building. A holding bar 66 is coupled with the rails 58, 60 to hold the louver 14 in a horizontal position when it is picked up and moved to an installation position. The holding bar 66 is secured onto the body of the louver holder rails 58, 60. The holding bar 66 is removed from the rails 58, 60 to enable the louver holder 34 to pivot along with the rails 58, 60.

A handle 68 is secured with one of the rails 58. The handle 68 enables an user to manipulate the louver 14 during installation in the building opening. The handle 68 may be bolted to the rail 58 and be removable during securement of the louver holder 34 with the louver 14.

A locking device 70 is positioned adjacent the louver holder 34. The locking device 70 includes a bar 72 that positions into an aperture 74 to lock the louver holder 34 in a vertical position during installation. Thus, the locking device 70 holds the louver 14 vertically so that it may easily be attached to the flanges 20 in the building opening.

During installation, the tool 10 is secured onto the lifting device 12. A louver 14 is generally positioned on a stack of louvers 14 in a horizontal position where it is bolted onto the louver holder 34. The lifting device 12 moves the louver 14 towards the opening 16 where the louver 14 is to be installed into the building. Generally, the lifting device 12 positions the louver 14 horizontally on the floor so that the holding bar 66 can be removed from the rails 58, 60.

After the holding bar 66 is removed, the lifting device 12 lifts the forks 22 which, in turn, lift the louver 14. As this occurs, the louver holder 34 is enabled to pivot to enable the louver 14 to pass toward a vertical position. The user manipulates the louver 14 via the handle 68. Generally, the louver 14 is passed through the opening 16 to the outside of the building. The handle 68 is manipulated to position the louver 14 into a vertical position. At this time, the locking device 70 is set to lock the louver 14 in a vertical position. The lifting device 12 then moves in a reverse direction to draw the louver 14 into the opening 16 from the outside of the building 18. The louver 14 is then positioned in the opening 16 with alignment of its apertures and the flange 20. The louver 14 is bolted onto the flanges 20 to secure the louver 14 in position in the building 18. During the process, the tool 10 is unbolted and removed from the louver 14. After this occurs, the louver 14 is continued to be bolted into position and the tool 10 is ready for the next louver 14.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tool for installing ventilation louvers comprising:
- a securing mechanism for securing the tool to a lifting device;
- a cross beam coupled with the securing mechanism;
- a louver holder pivotally coupled with the cross beam, the louver holder moving from a first securement position to a second installation position;
- a holding bar for holding the louver holder in the first position; and
- a handle for moving the louver holder from the first to the second position.

2. The tool of claim 1, further comprising a pair of rotary joints coupling the louver holder with the cross beam.

3. The tool of claim 1, wherein the louver holder including a pair of rails, one rail on each side of the cross beam, the rails facing one another.

4. The tool of claim 3, wherein the rails include a flange for temporarily bolting to a louver.

5. The tool of claim 1, further comprising a locking pin for locking the louver holder in the second position.

6. The tool of claim 1, further comprising a lock for locking the securing mechanism to the lifting device.

7. The tool of claim 1, further comprising a weight ballast coupled with the securing mechanism for adjusting the center of gravity.

8. A combination fork lift and ventilation louver tool comprising:
- a lifting device with at least one fork;
- a securing mechanism for securing the tool to the at least one fork;
- a cross beam coupled with the securing mechanism;
- a louver holder pivotally coupled with the cross beam, the louver holder moving from a first securement position to a second installation position;
- a holding bar for holding the louver holder in the first position; and
- a handle for moving the louver holder from the first to the second position.

9. The combination fork lift and ventilation louver tool of claim 8, further comprising a pair of rotary joints coupling the louver holder with the cross beam.

10. The combination fork lift and ventilation louver tool of claim 8, wherein the louver holder including a pair of rails, one rail on each side of the cross beam, the rails facing one another.

11. The combination fork lift and ventilation louver tool of claim 10, wherein the rails include a flange for temporarily bolting to a louver.

12. The combination fork lift and ventilation louver tool of claim 8, further comprising a locking pin for locking the louver holder in the second position.

13. The combination fork lift and ventilation louver tool of claim 8, further comprising a fork lock for locking the securing mechanism to the at least one fork.

14. A method for installing a louver in a building comprising:
- providing a lifting device according to claim 8;
- securing a louver to the louver holder;

positioning the louver with respect to ground;
removing the holding bar from the louver holder;
pivoting the louver toward a vertical position;
aligning the louver in a louver receiving opening; and
securing the louver in the opening.

15. The method for installing a louver in a building of claim 14, further comprising passing the louver through the louver receiving opening and drawing the louver back into the opening.

16. The method for installing a louver in a building of claim 14, further comprising positioning the louver on the louver holder horizontally and onto the ground and removing the holding bar.

17. The method for installing a louver in a building of claim 14, further comprising locking the louver in a vertical position.

18. The method for installing a louver in a building of claim 14, further comprising removing the tool from the louver.

* * * * *